(12) United States Patent
Greven

(10) Patent No.: US 6,790,402 B2
(45) Date of Patent: Sep. 14, 2004

(54) METHOD OF MAKING COMPLEX SHAPED ARTICLES

(76) Inventor: Richard Greven, c/o Advanced Honeycomb Technologies, Inc. 1015 Linda Vista Dr., Bldg. C, San Marcos, CA (US) 92069

( * ) Notice: Subject to any disclaimer, the term of this patent is extended or adjusted under 35 U.S.C. 154(b) by 0 days.

(21) Appl. No.: 09/236,017

(22) Filed: Jan. 22, 1999

(65) Prior Publication Data

US 2003/0121596 A1 Jul. 3, 2003

Related U.S. Application Data

(63) Continuation-in-part of application No. 08/939,238, filed on Sep. 29, 1997, now abandoned, which is a continuation of application No. 08/594,856, filed on Jan. 31, 1996, now abandoned.

(51) Int. Cl.[7] .............................................. B29C 53/00
(52) U.S. Cl. ....................... 264/285; 264/294; 264/319; 264/320; 264/339; 441/74; 428/116; 428/118; 280/609; 114/355
(58) Field of Search ................................ 156/197, 201, 156/196, 212, 214, 242, 246, 250, 267, 278, 279, 245, 200, 221, 256; 441/68, 74; 52/784.14, 793.1; 264/299, 319, 339, 295, 313, 320, 285, 291, 292, 554, 553, 294, 296, 321; 428/116, 117, 118; 244/123, 133; 114/355; 425/394, 398, 412; 72/470, 478, 475

(56) References Cited

U.S. PATENT DOCUMENTS

| | | | |
|---|---|---|---|
| 2,716,246 A | 8/1955 | Billingham | 441/70 |
| 2,855,664 A * | 10/1958 | Griffith et al. | 29/424 |
| 3,160,897 A | 12/1964 | Kelly, Jr. | 441/74 |
| 3,196,533 A * | 7/1965 | Ida et al. | 29/421.2 |
| 3,201,138 A | 8/1965 | Brown, Jr. | 280/610 |
| 3,276,784 A | 10/1966 | Anderson, Jr. | 280/610 |
| 3,514,798 A | 6/1970 | Ellis | 441/74 |
| 3,543,315 A | 12/1970 | Hoffman | 441/74 |
| 3,734,519 A | 5/1973 | Bennett | 280/610 |
| 4,013,810 A * | 3/1977 | Long | 428/308 |
| 4,222,808 A | 9/1980 | Hale et al. | 156/245 |
| 4,250,136 A | 2/1981 | Rex | 264/257 |
| 4,325,154 A | 4/1982 | Collum, Jr. | 441/74 |
| 4,383,955 A | 5/1983 | Rubio et al. | 264/46.6 |
| 4,391,924 A | 7/1983 | Uram, Jr. | 521/178 |
| 4,510,105 A | 4/1985 | Sherwood | 264/46.6 |
| 4,713,032 A | 12/1987 | Frank | 441/74 |
| 4,797,312 A | 1/1989 | Sherwood | 428/117 |
| 4,806,302 A | 2/1989 | Frank | 264/46.7 |
| 4,857,380 A | 8/1989 | Kent | 428/117 |
| 4,904,215 A | 2/1990 | Sherwood | 441/79 |
| 4,923,544 A * | 5/1990 | Weisse | 156/153 |
| 4,933,131 A | 6/1990 | Okey et al. | 264/255 |
| 4,964,825 A | 10/1990 | Paccoret et al. | 441/74 |
| 5,030,151 A | 7/1991 | Beacham | 441/79 |
| 5,119,535 A * | 6/1992 | Gnagy et al. | 29/469.5 |
| 5,145,430 A | 9/1992 | Keys et al. | 441/74 |
| 5,167,552 A | 12/1992 | Johnson, III | 441/74 |
| 5,171,509 A | 12/1992 | Le Masson et al. | 280/610 |
| 5,183,618 A | 2/1993 | Pascal et al. | 264/257 |
| 5,242,322 A | 9/1993 | Chellemi et al. | 441/79 |
| 5,266,249 A | 11/1993 | Grimes, III et al. | 264/45.2 |
| 5,273,472 A | 12/1993 | Skedeleski et al. | 441/79 |
| 5,306,188 A | 4/1994 | Skedeleski et al. | 441/79 |
| 5,514,017 A * | 5/1996 | Chimiak | 441/65 |
| 5,824,255 A * | 10/1998 | Ross et al. | 264/316 |
| 5,913,766 A * | 6/1999 | Reed et al. | 493/464 |

* cited by examiner

Primary Examiner—Jeff H. Aftergut
Assistant Examiner—Jessica Rossi
(74) Attorney, Agent, or Firm—Stephen E. Feldman, P.C.

(57) ABSTRACT

The complex shaped articles are formed by trimming, cutting and shaping a honeycomb core material to a desired size and shape, deforming the sized and shaped honeycomb core material at ambient temperature; permanently setting the shape and contour of the sized and shaped honeycomb core material; affixing side edges to the shaped and contoured honeycomb core material; and, bonding a fiber reinforced resin to the top and bottom surfaces of the honeycomb core material.

1 Claim, 4 Drawing Sheets

METHOD OF MAKING COMPLEX SHAPED ARTICLES

This application is a continuation-in-part of application Ser. No. 08/939,238 filed Sep. 29, 1997, now abandoned, which, in turn, is a continuation of application Ser. No. 08/594,856 filed Jan. 31, 1996 now abandoned.

FIELD OF THE INVENTION

The present invention generally relates to complex shaped articles and a method for manufacturing such articles. Illustrative of such complex shaped articles are aerodynamic airfoils (e.g., wings, rudders, elevators, and the like for use on planes, air ships, space vessels, and the like), hydrodynamic airfoils (e.g., ship rudders, ship stabilizers, sail boat keels, and the like), and other airfoil articles such as aquatic sports boards (e.g., surfboards, sailboards, water skis, and the like).

These complex shaped articles have generally followed similar, parallel routes in the evolution of their development and improvement; namely, lighter, more durable articles having complex shapes designed to perform in a selected environment. The development and improvement of such complex shaped articles can be traced through an aquatic sports board such as a surf board which presents a common background for and is exemplary of other types of complex shaped articles mentioned above; i.e., aerodynamic air foils and hydrodynamic air foils. The ensuing description of the invention, therefor, should be understood as being only exemplary and illustrative of these other types of complex shaped articles.

Riding a board on the crest of a wave as it approaches the shore dates back to at least the eighteenth century when European sailors documented the feat in the Sandwich Islands. The sport spread from Hawaii to California, Australia, South Africa and around the world in the twentieth century. As the sport was introduced around the world, the surfboards used were heavy, curvilinear artifacts measuring from twelve to twenty feet in length so that only the strongest surfers could handle them. With the advent of new technologies, construction techniques, and materials, the sport has grown in popularity and surfing enthusiasts have placed increasing demands on performance, maneuverability, speed, durability, weight and size.

Typical, commercially available surfboards are constructed from a core of foam or honeycomb material which is encased in a protective layer of reinforced resin and which usually include fins on their bottom surface to impart stability and control. These surfboards generally have curved profiles which aid a rider in maintaining fore and aft as well as side to side balance and which approximates the curvature of the forward slope of a wave. In efforts to improve their performance, aquatic sports boards have been produced having a variety of configurations and shapes. Fins have been added to provide stability and further improve performance and different types of materials have been used for their fabrication. Manufacturing techniques for such aquatic sports boards have generally required the use of complex molds, processes and tooling.

Surfboard riders generally desire a surfboard that will readily enable the user to attain maximum maneuverability within a wide range of speeds and to achieve the maximum speed possible for best overall performance. Maneuverability is governed primarily by the shape and the weight distribution of the surfboard which is typically augmented by the addition of one or more specially shaped fins on its underside. Weight is an important consideration in achieving maneuverability as minimum weight is a key factor in achieving the maximum speed possible for a specific surfboard design. Durability, resistance to damage, structural integrity, long term usability and appearance are other important requirements for the user and depend upon construction materials, manufacturing techniques and construction and structural design.

The development of and improvements to surfboards have been directed toward their construction, shape, maneuverability, speed, and decreased weight, but the combination of high performance, minimum weight, durability and attractive appearance have been difficult to obtain or have been unattainable. A simple method for their manufacture has been equally elusive.

Many attempts have been made to decrease the weight and improve the performance, construction and durability of aquatic sports boards. The literature for aquatic sports boards have described the use of honeycomb material, foam and other similar materials for their construction. Attempts to manufacture such aquatic sports boards have generally required the use of complex and costly molds, processes and tooling. Consequently, there still remains a need for light weight, high strength aquatic sports boards that will have long term durability, a high degree of maneuverability, an attractive appearance and that are easy and inexpensive to manufacture and that do not require complex molds, processes or tooling for their manufacture.

Surfboards having foam cores have been attempted. For example, U.S. Pat. No. 3,160,987 to Kelly, Jr. discloses a hydroplane surfboard fabricated from a fiberglass covered, air expanded plastic foam or balsam wood. The surfboard has a planing surface and a scorpion tail so that a rider, by body movement or shift in weight, can bring the planing surface into partial or full play or induce drag thereby achieving a wide range of speeds while maintaining maneuverability during surfing.

U.S. Pat. No. 4,713,032 and its divisional U.S. Pat. No. 4,806,302 both to Frank disclosed a method for manufacturing surfboards and sail boards in which a prefabricated foam core has fibrous material wound about it. A resin such as polyurethane is especially set with a reaction retarder and poured onto the fibrous material whereupon the foam core is then inserted into a molding tool and the mold is closed to cure the resin.

U.S. Pat. No. 3,543,315 to Hoffman discloses a soft board fabrication in which a surfboard with a low density core is provided with a skin of depressible material. The core can be constructed from a phenolic impregnated paper honeycomb material.

U.S. Pat. No. 5,145,430 to Keys, et.al. discloses a surf craft such as a surfboard or windsurfer having a planing plank with a stiffening spine integral with the planing plank to impart additional strength and flexibility. The surf craft has a sandwich construction with a core of foam material encased by a shell of fiber reinforced resin.

Hollow surfboards and sail boards have also been attempted. For example, U.S. Pat. No. 3,514,798 to Ellis discloses a surfboard with an outer shell or skin of solidified laminating polyester resin adhered to a sheet of honeycomb material and a longitudinal cavity within the surfboard. A sheet of glass cloth is pressed onto the outer shell or skin of solidified laminating polyester resin while the resin is still moist and it is then impregnated with the same resin while in a mold. The mold consists of two halves having the configuration of the surfboard when the mold is closed. The moist outer shell is pressed onto the honeycomb material which is then impregnated with a thermosetting phenolic resin and secured by adhesion. The resulting structure includes considerable air space within the body of the surfboard.

U.S. Pat. No. 4,964,825 to Paccoret discloses an aquatic board construction for surfboards and sail boards in which shaped upper and lower sections are joined together to form a board with a generally hollow interior. Each section is formed with a generally sandwich construction including a high strength outer skin, an inner skin spaced from the outer skin, and a core formed from filler material which is sandwiched between the inner and outer skins. The inner and outer skins can be formed from one or more layers of a cured thermosetting resin which has been impregnated into a fabric material. The core can be provided from a foam or honeycomb material.

U.S. Pat. No. 5,266,249 to Grimes III, et.al. discloses a method of forming a hollow, fiber reinforced plastic structure, such as the hull of a sail board, from a fiber reinforced plastic material in a female mold.

Foam filled honeycomb and foam filled plastic objects are also of interest.

For example, U.S. Pat. No. 4,797,312 to Sherwood discloses a foam-honeycomb article and method for its manufacture wherein expanded foam in the cells of a multi-cell honeycomb material braces the honeycomb side walls against collapse to increase the strength and rigidity of the article.

U.S. Pat. No. 4,383,955 to Rubio discloses a process for fabricating hollow, foam filled, reinforced plastic objects such as surfboards using a multi-part mold.

U.S. Pat. No. 4,510,105 to Sherwood discloses a method for molding an article having a core of foam and a surface reinforced by fiberglass clothe which can be used as a surfboard.

Foam filled honeycomb core skis and honeycomb core skis have been disclosed.

For example, U.S. Pat. No. 3,276,784 to Anderson discloses a laminated snow ski having a foam filled honeycomb core. The ski construction is composed of a molded, elongated, resin impregnated fiberglass outer shell and a foam filled aluminum honeycomb core integrally bonded to the interior surfaces of the fiberglass outer shell.

U.S. Pat. No. 3,734,519 to Bennett discloses a one shot molded ski having cored recesses at right angles to the general plane of the ski.

U.S. Pat. No. 3,201,138 to Brown, Jr. discloses a laminated ski construction with a cellular honeycomb core.

U.S. Pat. No. 5,183,618 to Pascal, et.al. discloses a process for manufacturing a ski whose body includes a core covered with a shell and which is fabricated in a mold cavity. The core can include a synthetic foam or aluminum honeycomb.

As can be seen from the foregoing, efforts have been made towards construction, shape, maneuverability, increased speed and decreased weight. However, the combination of high performance, minimum weight, durability and attractive appearance have been difficult to achieve or unattainable, especially for aquatic sports boards. Attempts to manufacture such aquatic sports boards have generally required complex molds, processes and tooling. Honeycomb core shaping, for example, is typically performed on a five axis milling machine in order to obtain the complex shapes necessary for contouring aquatic sports boards. Such milling machines normally remove material measuring approximately 2.0" by 0.40" at a rate of about 300 linear inches of material per minute consuming about one hour to shape one side of a typical aquatic sports board. Most of the known aquatic sports boards are too heavy to achieve the highest speeds and optimum performance possible while retaining long term durability and an attractive appearance. A typical "light weight" aquatic sports board currently available weighs about 5.4 pounds.

For the foregoing reasons, it would be desirable to provide an aquatic sports board that is lighter in weight, has high strength, provides long term durability, has a high degree of maneuverability and an attractive appearance, is easy and inexpensive to manufacture, and which does not require complex molds, processes, or costly tooling for its manufacture.

As mentioned earlier, the foregoing discussion relating to aquatic sports boards and their manufacture is equally applicable to the other types of complex shaped articles described hereinabove; i.e., aerodynamic air foils, hydrodynamic air foils and other air foil articles.

SUMMARY OF THE INVENTION

The present invention is directed to complex shaped articles and a method for manufacturing light weight, high strength complex shaped articles having long term durability and a high degree of maneuverability that is simple, easy and inexpensive, does not require complex molds, processes or tooling, and that will result in a significant reduction in weight of such complex shaped articles.

Features of the invention include a one piece honeycomb core conformably shaped for dynamic movement, formed edges, and an outer skin having at least one layer of fiber reinforced resin adjoined to the honeycomb core for protecting and encasing the honeycomb core and to provide a drag resistant surface.

In general, the method for manufacturing the complex shaped articles of the invention comprises: trimming, cutting and shaping a core to a desired size and shape; deforming said core; permanently setting the shape and contour of said core; affixing edges to said core; and, affixing at least one layer of fiber reinforced resin to the top and bottom surfaces of said core.

Illustrative and exemplary of the complex shaped articles that can be provided according to the present invention are:

An article having a contoured arc extending along its longitudinal axis from the front end to the rear end of said article and a contoured arc extending across its transverse axis between the opposed sides of said article such that a concave, symmetrical contour is defined on the upper surface of said article and a convex, symmetrical contour is defined on the lower surface of said article.

Articles having this type of complex shape can be used for aquatic sports boards such as surfboards and sail boards. When grooves are added to their bottom, contact surfaces and their forward ends are turned upwardly, such articles can be used as snow skis, water skis, hydroplanes, and the like.

An article having a contoured, arcuate shape on one surface thereof extending across its transverse axis between the opposed sides of said article and extending along its longitudinal axis from one end to the other of said article such that a convex, symmetrical arc is defined between said opposed sides on one surface of said article, said convex arc being significantly higher at one of said opposed sides and tapering therefrom across said transverse axis and along said longitudinal axis to a significantly lower height at the other of said opposed sides.

Articles having this type of complex shape can be used as aerodynamic air foils such as wings and elevators for air planes, air ships, space vessels, and the like, as well as hydrodynamic air foils such as stabilizers for ships.

Articles having a symmetrical, contoured arcuate shape on both planar surfaces of said article extending across the transverse axis of each planar surface between the opposed sides of said article and extending along the longitudinal axis from one end to the other on each planar surface of said article such that a symmetrical, convex arc is defined between said opposed sides along said longitudinal axis on each of said planar surfaces, said convex arc being significantly higher at one of said opposed sides on each of said planar surfaces and tapering therefrom across said transverse axis of each of said planar surfaces and along said longitudinal axis to a significantly lower height at the other of said opposed sides.

Articles having this type of complex shape can be used as aerodynamic air foils such as wings, rudders and elevators of air planes, air ships, space vessels, and the like, as well as hydrodynamic air foils such as rudders, stabilizers, keels, and the like for ships and sailing vessels.

BRIEF DESCRIPTION OF THE DRAWING

The features, aspects and advantages of the present invention will become more apparent from the ensuing description when considered together with the accompanying drawing which illustrates the complex shaped articles of the invention through its application to an aquatic sports board and in which.

DETAILED DESCRIPTION OF THE DRAWING AND THE INVENTION

Figure 1:
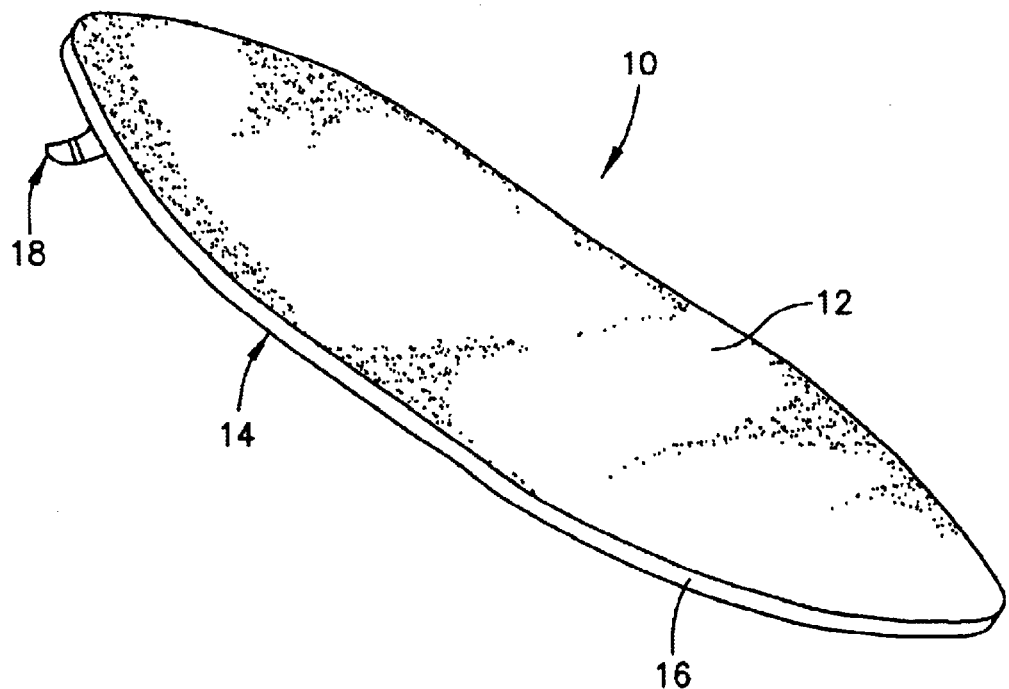
FIG. 1 is a perspective view of an aquatic sports board constructed in accordance with the present invention.
Figure 2:
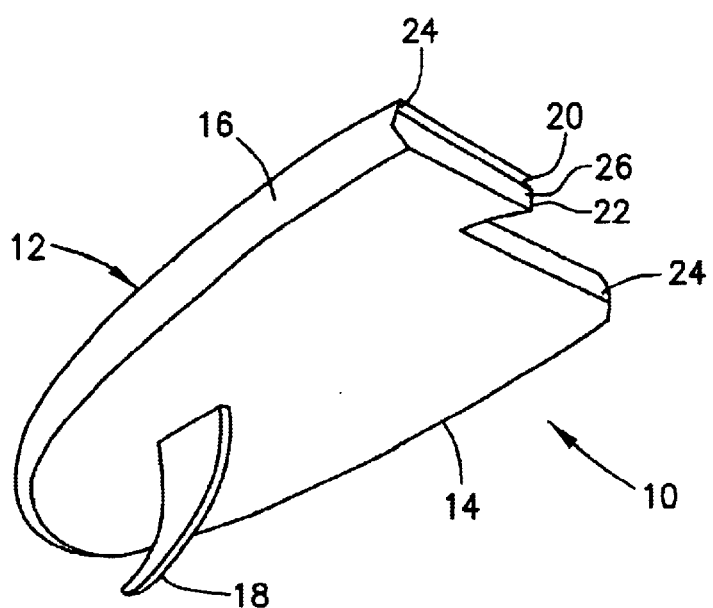
FIG. 2 is an inverted perspective view of the aft portion of the aquatic sports board shown in FIG. 1 showing a cross section at the mid section of the aquatic sports board.

With reference to the drawing wherein like reference numerals identify like parts FIGS. 1 and 2 illustrate as an embodiment of the invention an aquatic sports board 10 for use in water sports having a top surface 12, a bottom surface 14 and opposed side edges 16. Optionally, a fin 18 can be secured to the bottom surface 14 to provide stability and maneuverability. The top surface 12, bottom surface 14 and opposed side edges 16 can each be provided with at least one layer of a fiber reinforced resin to form a top skin 20, a bottom skin 22 and formed edges 24 on the opposed side edges 16 bonded to a core of honeycomb material 26 to comprised the aquatic sports board 10. The fiber reinforced resin serves to encase and protect the honeycomb core 26 and also provides a drag resistant surface for water borne (i.e., hydrodynamic) movement of the aquatic sports board 10.

Any suitable, commercially available fiber reinforced resin can be used for this purpose such as glass or Keviar fiber reinforced resin. The honeycomb core 26 which is conformably shaped for water borne dynamic movement of the aquatic sports board 10, can also be provided from commercially available, semi-rigid, thermosetting honeycomb material such as Nomex honeycomb, a honeycomb paper product available from the Kraft Paper Company, or other appropriate honeycomb material that can be deformed and contoured to a predetermined, fixed shape.

Portions of the top surface 12, bottom surface 14 and opposed side edges 16 of the aquatic sports board 10 can be finished with a durable coating such as an epoxy paint or other suitable material, or can be left unfinished to provide a view of the honeycomb core material 26 through the semi-transparent top and bottom skins 20 and 22, respectively.

With particular reference to FIGS. 3–11 and occasional reference to FIGS. 1 and 2, the method of the present inventive method generally comprises:

a) trimming, cutting and shaping a honeycomb core material to a desired size and shape;

b) deforming the honeycomb core to a desired shape and contour;

c) permanently setting the shape and contour of the deformed honeycomb core;

d) affixing edges to the opposed sides of the shaped and contoured honeycomb core; and, e) bonding at least one layer of a fiber reinforced resin to the top and bottom surfaces of the honeycomb core.

Figure 3:
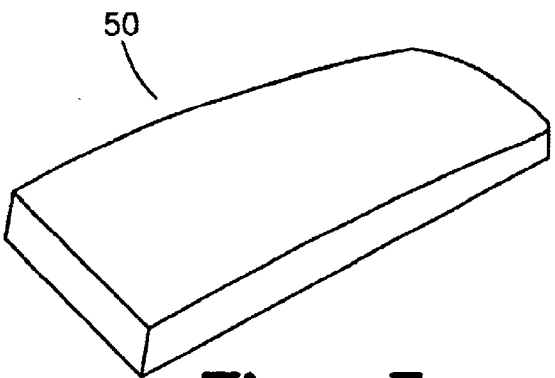
FIG. 3 is a perspective view of a flat sheet of semi-rigid, honeycomb core material prior to being trimmed.
Figure 4:
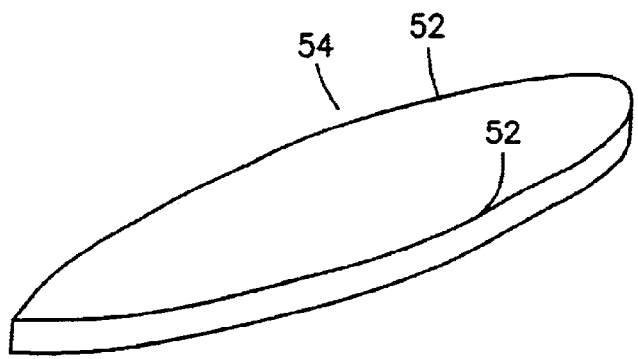
FIG. 4 is a perspective view of the semi-rigid, honeycomb core material shown in FIG. 3 after it has been trimmed to shape.
Figure 5:
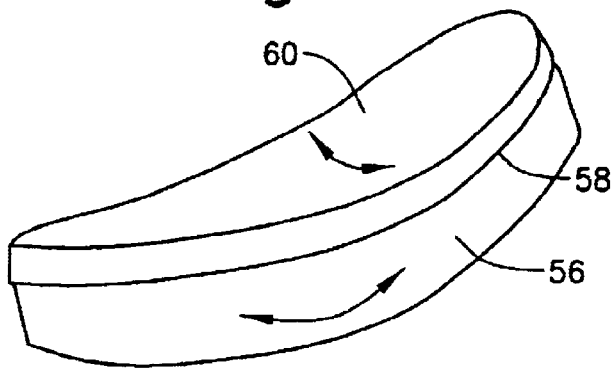
FIG. 5 is a perspective view of the trimmed and shaped semi-rigid, honeycomb core material of FIG. 4 shown abutted against a fixture in preparation for cutting.

As shown in FIGS. 3–11, a flat sheet of a semi-rigid, honeycomb core material 50 is trimmed to a desired edge shape 52 resulting in an edge shaped honeycomb core 54 (FIGS. 3 and 4). The trimmed and edge shaped honeycomb core 54 is then abutted against a fixture or open mold 56 having a predetermined or desired shape and contour such as by placing weights on the top surface 12 of the edge shaped honeycomb core 54 so that the edge shaped honeycomb core 54 conformably adapts to the shape and contour of the fixture or open mold 56 at the interface 58 formed between the bottom surface 14 of the edge shaped honeycomb core 54 and the upper surface of the fixture or open mold 56. Sufficient weight is thus applied to the top surface 12 of the edge shaped honeycomb core 54 to result in obtaining a contoured shaped honeycomb core 60 that conformally matches the shape and contour of the fixture or open mold 56 (FIG. 5). The trimmed and edge shaped honeycomb core 54 can also be abutted against the fixture or open mold 56 by strapping or clamping the edge shaped honeycomb core 54 to the fixture or open mold 56 or by any other appropriate means to form the desired contoured shaped honeycomb core 60 that conformally matches the contoured shape of the fixture or open mold 56.

Figure 6:
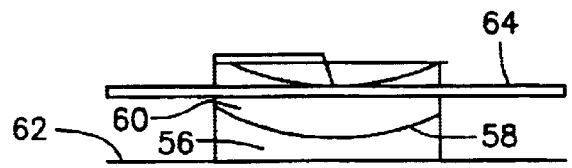
FIG. 6 is an end view of the trimmed and shaped semi-rigid, honeycomb core material of FIG. 5 being cut by a horizontal band saw as it is retained abutted against the fixture.
Figure 7:
FIG. 7 is a perspective view of the semi-rigid, honeycomb core material after having been cut to size and removed from the fixture shown with its edges chamfered and readied to accept edge molds.
Figure 8:
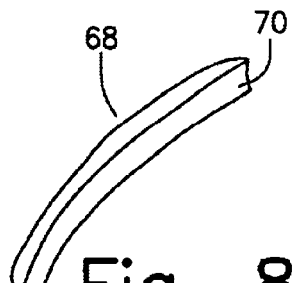
FIG. 8 is a perspective view of an edge mold that can be used to conform a desired shape and curvature to one of the edges of the aquatic sports board.
Figure 9:
FIG. 9 is a side view of a semi-rigid, honeycomb core that can be used in the present invention after the honeycomb core material has been heated and formed to retain a desired conformably bent contoured shape.

As is shown in FIG. 6, the fixture or open mold 56 and the abutted, contoured shaped honeycomb core 60 are placed on a table 62 or other suitable support surface. A horizontal band saw 64 or other appropriate cutting tool is then set at a predetermined distance from the table 62 in order to cut the contoured shaped honeycomb core 60 to a predetermined, desired distance on a plane parallel to the longitudinal axis of the contoured shaped honeycomb core 60. Excess honeycomb core material can be discarded or can be salvaged for use in smaller parts, the contoured shaped honeycomb core is removed from the fixture or open mold 56, and the shaped opposed edges 52 of the contoured shaped honeycomb core 60 are prepared by sanding or other appropriate means to form chamfered shaped opposed edges 66 to accept edge molds 68. If desired, the contoured shaped honeycomb core 60 can be inverted, placed on the table 62, and cut horizontally on its reverse side (i.e., its bottom surface 14) either prior to or after preparing the shaped, opposed edges 52. In most applications for producing aquatic sports boards 10 having a desired contour and shape, however, this will not be necessary although it may be required or desired for producing other complex shaped articles of the invention.

Each of the edge molds 68 are fabricated to have a concave interior portion 70 that conforms to the desired shape and curvature of the opposed edges 16 of the aquatic sports board 10. The edge molds 68 are secured to the opposed, chamfered edges 66 of the contoured shaped honeycomb core 60 in order to conformally bend the contoured shaped honeycomb core 60 along its longitudinal axis (and, when desired or required, across its transverse axis) until the predetermined and desired shape is achieved for the aquatic sports board 10.

As mentioned earlier, the contoured shaped honeycomb core can be provided from a semi-rigid, thermosetting honeycomb core material such as Nomax. However, the honeycomb core material can also be provided from other appropriate materials which do not require heat to permanently set them in a predetermined or desired contoured shaped honeycomb core 60. Illustrative of the honeycomb core materials that can be used which do not require heat to permanently be set are such materials as Kraft paper having a honeycomb core, resins that set at room temperature, and the like. When such materials are not used, heat is applied in order to form the contoured shaped honeycomb core 60 so as to ensure that the contoured shaped honeycomb core 60 will retain its desired shape and curvature. Heat can be applied by using a heat gun or any other suitable means. After the shape and curvature of the contoured shape honeycomb core 60 has been set, the edge molds 68 are removed from the chamfered edges 66 of the honeycomb core 26.

A mixture of epoxy resin, polyamide and phenolic or glass hollow spheres is then prepared in the form of a very light weight, high strength, putty-like substance that can be spread and molded and which will dry or cure to a very hard substance. The edge molds 68 are then coated with this mixture which acts as an edge fill after hardening or curing. The edge molds 68 are then placed back onto the chamfered edges 66 of the honeycomb core 26 and the mixture is allowed to harden or cure after which the edge molds 68 are removed. The hardened or cure edge fill is then filed, sanded, or otherwise shaped to provide the formed opposed side edges 24 of the aquatic sports board 10.

Alternatively, the formed edges 24 of the aquatic sports board can comprise a polyester mat and a mixture of epoxy resin, polyamide and phenolic or glass hollow spheres for the edge fill. The polyester mat is first placed in the edge molds 68, then coated with the mixture and allowed to harden and cure. The resultant, hardened and cured polyester mat surrounded by the hardened and cured edge fill mixture is then bonded to the honeycomb core 26 using more of the edge fill mixture which is then allowed to harden and cure. The hardened and cured polyester mat surrounded by the edge fill mixture bonded to the honeycomb core 26 can the be filed, sanded and shaped to provide the formed edges 24 of the aquatic sports board 10.

At least one layer, preferably two layers, of glass or Kevlar reinforced resin is applied to the top and bottom surfaces 12 and 14, respectively, of the honeycomb core 26 with an epoxy resin, one surface at a time, to provide the aquatic sports board outer top skin 20 and bottom skin 22.

Figure 10:
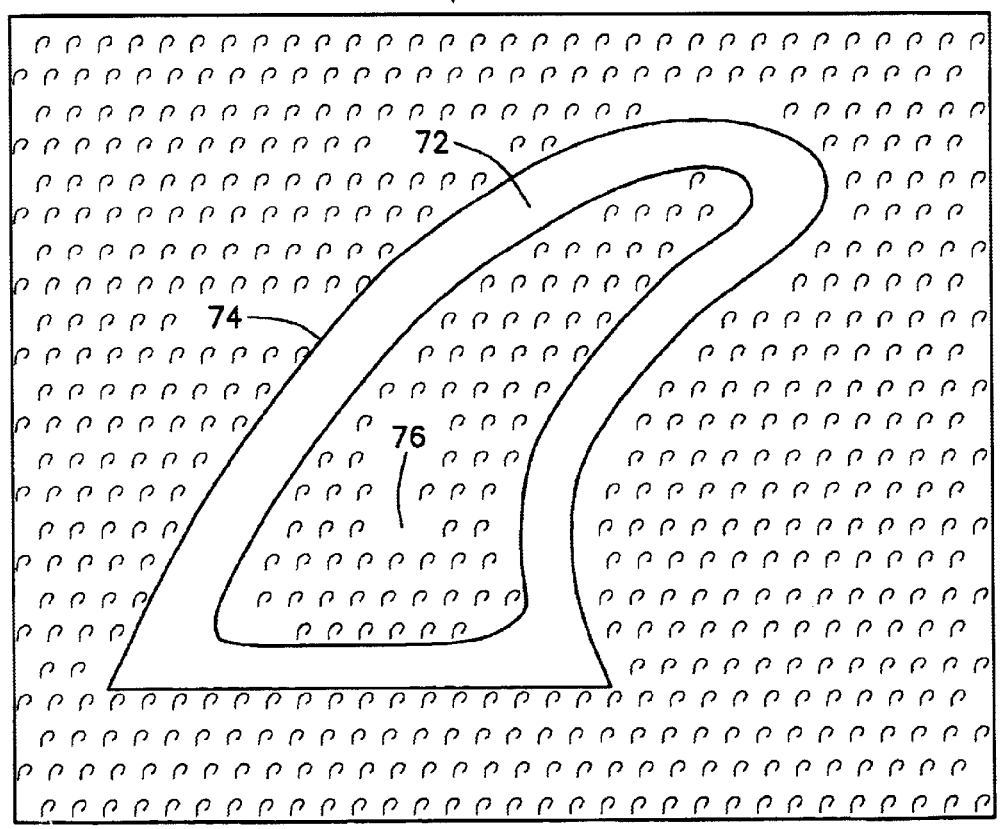
FIG. 10 is a top view of a sheet of honeycomb core material with a mixture of epoxy resin, polyamide and phenolic hollow spheres poured into the cells of the honeycomb sheet in an area pattern that defines a desired fin shape; and, FIG. 11 is a side view of an optional fin bonded to a flat glass laminate which can then be mounted to the bottom surface of an aquatic sports board constructed in accordance with the present invention.
Figure 11:
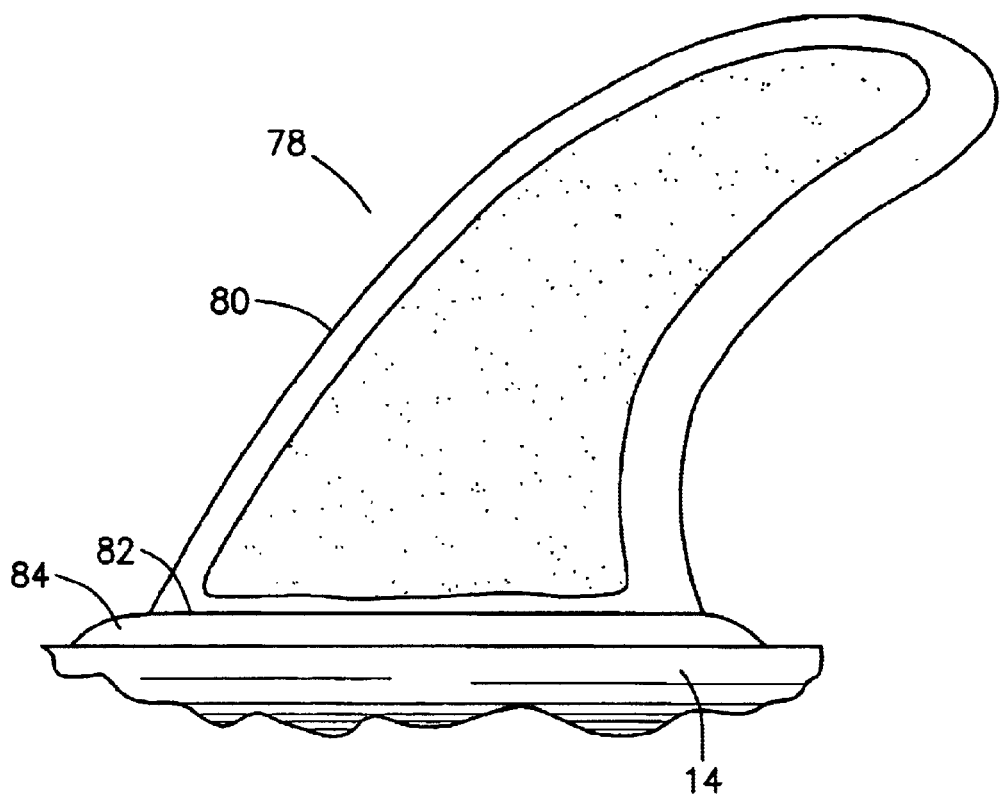

Optionally, a fin 18 can be secured to the bottom surface 14 of the aquatic sports board 10 to provide stability and maneuverability. As shown in FIG. 10, a mixture of epoxy resin, polyamide and phenolic or glass hollow spheres can be poured into the cells of the honeycomb sheet 70 in a pattern area 72 having a desired fin shape 74. An area 76 of the honeycomb sheet 70 internal to the pattern area 72 is preferably left void of the mixture to provide a lighter weight fin 18. The mixture is allowed to cure and harden after which the honeycomb sheet 70 is laminated between at least one layer of epoxy coated glass or Kevlar fiber reinforced resin on each side of the honeycomb sheet 70. After the epoxy coated glass or Kevlar fiber reinforced sheet has cured and hardened, the laminated honeycomb sheet 70 can then be trimmed to the desired fin shape 74 to provide a trimmed fin 78 (FIG. 11). The edges 80 of the trimmed fin 78 are then filled with a mixture of epoxy resin, polyamide and phenolic or glass hollow spheres which is then permitted to cure and harden. The hardened and cured edge fill can then be ground and shaped with a grinder or router or other appropriate tool to obtain the desired shape of the fin 18.

Alternatively, fin 18 can be stamped to the desired shape. After being stamped, fin 18 can then be coated with at least one additional layer of epoxy coated glass or Kevlar fiber reinforced resin for added strength and allowed to cure and dry. Fin 18 can be bonded at fin base 82 to a flat glass laminate 84 for subsequent mounting to the bottom surface 14 of an aquatic sports board 10 or fin 18 can be bonded directly to the bottom surface 14 of an aquatic sports board 10. The flat glass laminate 84 can also be bonded directly to the bottom surface 14 of an aquatic sports board or be bolted thereto or otherwise directly affixed using appropriate hardware.

The method of the present invention results in producing an aquatic sports board 10 that is much lighter in weight, stronger and more durable and damage resistant than other aquatic sports boards. An aquatic sports board produced according to the method of the invention is approximately 70 to 75% of the weight of currently available "light weight" aquatic sports boards. Typically, the average weight of an aquatic sports board produced according to the method of the invention is about 3.9 pounds as opposed to a weight of about 5.4 pounds for currently available, "light weight" auatic sports boards manufactured by other methods.

Although the present invention has been described with particularity and in considerable detail with specific reference to aquatic sports boards, it should be expressly understood that this has been presented to be only exemplary and illustrative of the invention. As stated several times hereinabove, the present invention is equally applicable to produce other complex shaped articles such as aerodynamic and hydrodynamic air foils. Thus, it will be apparent to one skilled in this art that changes and modifications can be made herein without departing from the scope and spirit of the invention.

What is claimed is:

1. A method of forming a complex aerodynamic and hydrodynamic article comprising the steps of:

a. trimming a honeycomb material to a desired shape, said shape comprising a core having a top surface, a bottom surface and side edges;

b. abutting said trimmed honeycomb core against an open mold, said mold having an open surface and a predetermined contour and shape;

c. conforming said honeycomb core to the shape of said mold by applying pressure to said top surface of said trimmed honeycomb core;

d. before removing said pressure and before removing said core from said mold, cutting said conformed honeycomb core substantially parallel to the open surface of the mold, whereby said honeycomb has a thickness defined by the distance between the mold contour and the cut surface;

e. releasing said pressure so that said honeycomb forms a surface between opposed sides on the upper surface of said article, that is higher than at least one of said opposed sides.

* * * * *